US008364690B2

(12) United States Patent
Gonzalez et al.

(10) Patent No.: US 8,364,690 B2
(45) Date of Patent: Jan. 29, 2013

(54) AUTOMATIC CREATION OF PRE-CONDITION QUERIES FOR CONFLICT DETECTION IN DISTRIBUTED PROCESSING SYSTEMS

(75) Inventors: Robert N. Gonzalez, Boston, MA (US); Rouben Meschian, Boston, MA (US); Elias D. Torres, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 12/035,267

(22) Filed: Feb. 21, 2008

(65) Prior Publication Data
US 2009/0216714 A1 Aug. 27, 2009

(51) Int. Cl.
*G06F 17/30* (2006.01)
(52) U.S. Cl. ....................................................... 707/758
(58) Field of Classification Search .................. 707/610, 707/690, 703, 609, 687, 758
See application file for complete search history.

(56) References Cited

U.S. PATENT DOCUMENTS

| | | | | |
|---|---|---|---|---|
| 5,787,262 | A * | 7/1998 | Shakib et al. ................. | 709/205 |
| 6,847,962 | B1 | 1/2005 | Cochrane et al. | |
| 2004/0117359 | A1 | 6/2004 | Snodgrass et al. | |
| 2004/0153448 | A1 | 8/2004 | Cheng et al. | |
| 2005/0004907 | A1 | 1/2005 | Bruno et al. | |
| 2005/0081192 | A1* | 4/2005 | DeLine et al. ................ | 717/126 |
| 2006/0047721 | A1 | 3/2006 | Narang et al. | |
| 2006/0101073 | A1* | 5/2006 | Popa et al. .................. | 707/104.1 |
| 2006/0136388 | A1 | 6/2006 | Steinau et al. | |
| 2006/0136396 | A1* | 6/2006 | Brobst .............................. | 707/3 |
| 2006/0190476 | A1 | 8/2006 | Mettovaara et al. | |
| 2006/0235823 | A1* | 10/2006 | Chong et al. ..................... | 707/1 |
| 2006/0235837 | A1 | 10/2006 | Chong et al. | |
| 2009/0138437 | A1* | 5/2009 | Krishnamoorthy et al. ...... | 707/3 |

OTHER PUBLICATIONS

Beckett, Dave, et al., "SPARQL Query Results XML Format," Jan. 15, 2008, W3C, p. 1-8.*
Sibersandi, "Resource Description Framework," Feb. 20, 2007, Wikipedia.org, p. 1-7.*
Seaborne, Andy, et al., "SPARQL Update," Jul. 15, 2008, W3C, p. 1-13.*
Forte, Ben, "Teach Yourself SQL" 2001, Sams, second edition, p. cover, 1-2, 26-29, and 130-133.*
Liu Yanhong Annie , "IfpreconditionThen", http://www.cs.sunysb.ed/~liu/cse305/h5s.

* cited by examiner

*Primary Examiner* — Etienne Leroux
(74) *Attorney, Agent, or Firm* — Jon A. Gibbons; Fleit Gibbons Gutman Bongini & Bianco PL

(57) ABSTRACT

Disclosed are a method, information processing system, and computer program storage product for managing Resource Description Framework ("RDF") graphs in a distributed system. At least one modification request for modifying an RDF graph in a shared data store is received. The modification request includes a query set, an expected result set, and a change set associated. The query set is a set of preconditions for guaranteeing a state of the RDF graph before executing the change set. The expected result set is results expected by the query. The change set is at least one statement that changes data elements in the RDF graph. The query is applied to the RDF graph at the shared data store. A result of the query is analyzed. A transaction request, which includes the change set, associated with the modification request is sent to a server information processing system communicatively coupled to the shared data storage.

20 Claims, 3 Drawing Sheets

AUTOMATIC CREATION OF PRE-CONDITION QUERIES FOR CONFLICT DETECTION IN DISTRIBUTED PROCESSING SYSTEMS

FIELD OF THE INVENTION

The present invention generally relates to the field of distributed processing systems, and more particularly relates to conflict resolution for distributed processing systems.

BACKGROUND OF THE INVENTION

In current distributed processing systems, clients can interact with distributed applications for creating and modifying data. The clients access a central or distributed data storage for modifying data as compared to working on a per-document basis. Therefore, a plurality of clients can be working on the same data simultaneously. This simultaneous interaction leads to conflicts within the data storage. For example, a client makes a local copy of the data it wants to modify. The client makes the desired changes to the local data, which is then sent to the data storage.

However, another client working on the same data merged its changes with the data storage prior to the first client. Therefore, the changes made by the first client were made to outdated data. In other words, a conflict now exists within the data store. The ability to detect these conflicts as they arise is necessary for any central/distributed data storage. Current distributed processing systems require manual creation of queries to detect conflicts. Manual creation of these queries is very time consuming and burdensome to the developer.

Therefore a need exists to overcome the problems with the prior art as discussed above.

SUMMARY OF THE INVENTION

Briefly, in accordance with the present invention, disclosed are a method, information processing stream, and computer program storage product for managing Resource Description Framework ("RDF") graphs in a distributed system. The method includes receiving at least one modification request for modifying an RDF graph in a shared data store. The modification request includes a query set, an expected result set, and a change set associated. The query set is a set of preconditions for guaranteeing a state of the RDF graph before executing the change set. The expected result set is results expected by the query. The change set is at least one statement that changes data elements in the RDF graph. The query is applied to the RDF graph at the shared data store. A result of the query is analyzed. A transaction request associated with the modification request is sent to a server information processing system communicatively coupled to the shared data storage in response to the results of the query matching the expected result set. The transaction request comprises the change set.

In another embodiment, an information processing system for managing Resource Description Framework ("RDF") graphs in a distributed system is disclosed. The information processing system includes a memory and a processor that is communicatively coupled to the memory. The information processing system also includes a data transaction module that is communicatively coupled to the memory and the processor. The data transaction module is adapted to receive at least one modification request for modifying an RDF graph in a shared data store. The modification request includes a query set, an expected result set, and a change set associated. The query set is a set of preconditions for guaranteeing a state of the RDF graph before executing the change set. The expected result set is results expected by the query. The change set is at least one statement that changes data elements in the RDF graph. The query is applied to the RDF graph at the shared data store. A result of the query is analyzed. A transaction request associated with the modification request is sent to a server information processing system communicatively coupled to the shared data storage in response to the results of the query matching the expected result set. The transaction request comprises the change set.

In yet another embodiment, a computer program storage product for managing Resource Description Framework ("RDF") graphs in a distributed system is disclosed. The computer program storage product includes instructions for receiving at least one modification request for modifying an RDF graph in a shared data store. The modification request includes a query set, an expected result set, and a change set associated. The query set is a set of preconditions for guaranteeing a state of the RDF graph before executing the change set. The expected result set is results expected by the query. The change set is at least one statement that changes data elements in the RDF graph. The query is applied to the RDF graph at the shared data store. A result of the query is analyzed. A transaction request associated with the modification request is sent to a server information processing system communicatively coupled to the shared data storage in response to the results of the query matching the expected result set. The transaction request comprises the change set.

One advantage of the various embodiments of the present invention is that it provides automatic conflict detection for shared data. Modification requests are generated when a user modifies shared data on a local machine. Preconditions are automatically generated that are associated with the modification requests to detect and surface conflicts when the modifications are attempted at the local store. Developers are no longer required to manually create precondition queries. Manual creation of precondition queries is a very time consuming and tedious task.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Massively Parallel Processing System

Figure 1:
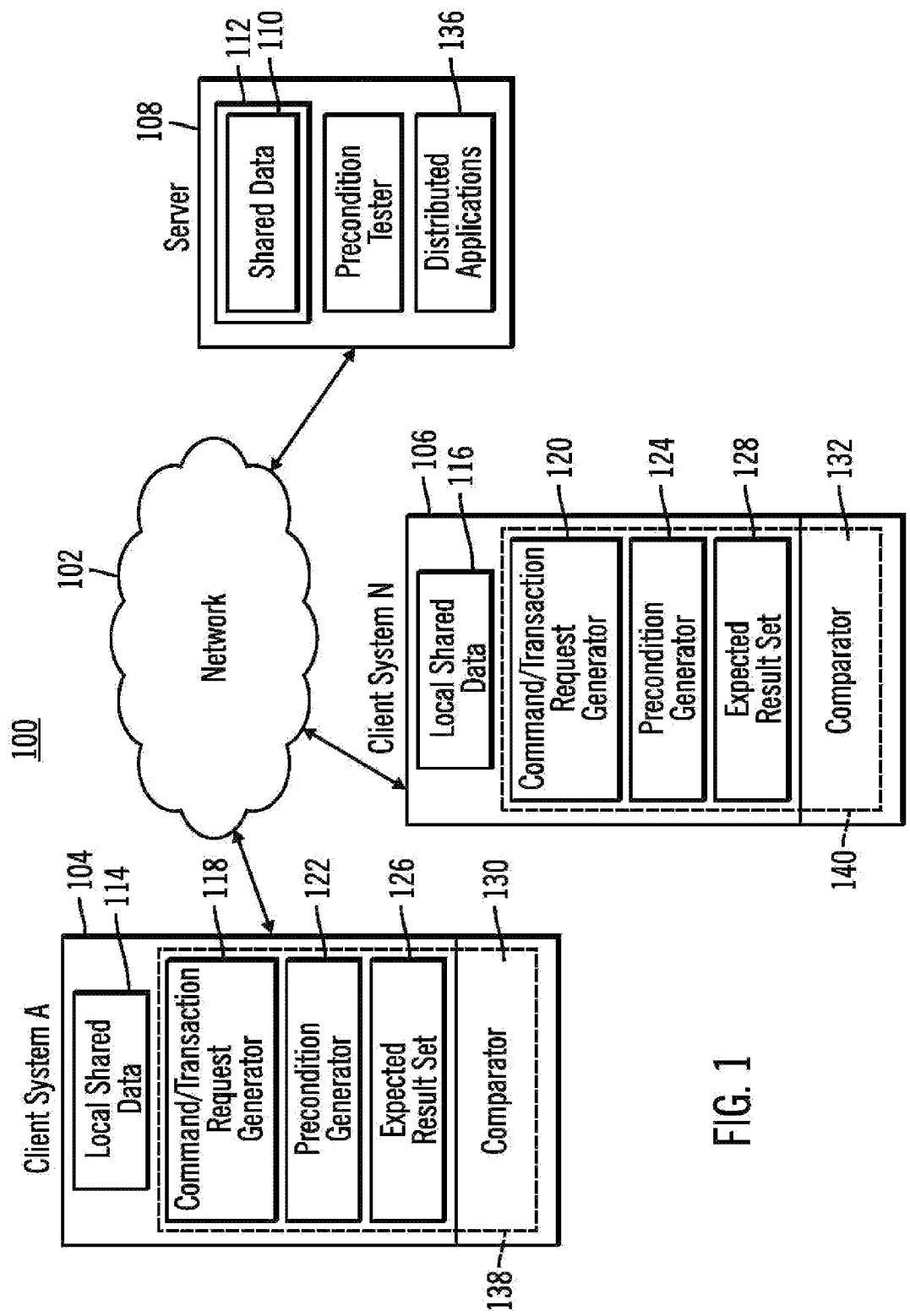
FIG. 1 is a block diagram illustrating a distributed processing system according to one embodiment of the present invention.

According to one embodiment of the present invention, as shown in FIG. 1, a distributed processing system 100 is illustrated. FIG. 1 shows a network 102 that connects a plurality of information processing systems such as client system A 104 and client system N 106 to a server 108. The network 102 supports any number of information processing systems 104, 106, 108. The client systems 104, 106 and the server 108, in one embodiment, are personal computers, workstations, personal digital assistants, or the like. The network 102 can be a wide area network such as the Internet, a local area network, or the like.

Each of the client systems 104, 106 are communicatively coupled to each other and the server 108 via the network 102. In the current example, the client systems 104, 106, server 108, and the network 102 are part of the distributed processing system 100. In one embodiment, the client systems 104, 106 access data stored on the server 108. A copy of the data to be accessed is stored locally on the client system 104, 106. From hereon in the data accessed by each of the client systems 104, 106 is referred to as "shared data" 110. The shared data 110, in the current example, resides within a shared data store 112 such as a relational database, extensible markup language ("XML") documents, resource description framework ("RDF") graphs, or the like.

A shared data store 112, in one embodiment, allows a plurality of clients to access the same data. The shared data 110 does not have to reside on the server 108. For example, the shared data 110 can reside within a distributed data store comprising a plurality of remote information processing systems. The shared data 110 can also reside within a central data store located on the server 108 or on a remote information processing system communicatively coupled to the server 108. In the examples where the shared data resides on one or more remote information processing systems, the client systems 104, 106 access the data through the server 108.

The client systems 104, 106 can interact with the shared data 100 via distributed applications 136 residing on the server 108. For example, each client system 104, 106 initializes a distributed application 136 such as a spreadsheet application for creating, and modifying the shared data 110. The client systems 104, 106 modify the data locally (i.e. the local shared data 114, 116), which is then merged with the shared data 110 on the shared data store 112. Therefore, local changes to the data 114, 116 are not reflected in the shared data store 112 until the data 114, 116 is sent back to the shared data store 112. However, in the distributed processing system 100 other clients may also be interacting with the same data or data that affects the data 114, 116. Therefore, when one client system 104, 106 tries to modify certain data, those modifications may conflict with modifications made by another client system 104, 106.

To detect these conflicts, a command or transaction request generator 118, 120, a precondition generator 122, 124, an expected result set generator 126, 128, and a comparator 130, 132 are provided to the client systems 104, 106. Each of these components is discussed in greater detail below. In one embodiment, these components reside within a data transaction module 138, 140. For example, the distributed application 136 being used by a client system 104, 106 provides each of these modules 118, 122, 126 to a client system 104, 106. These modules can reside locally on a client system 104, 106, as shown in FIG. 1 or can alternatively reside on the information processing system including the distributed application 136 such as the server 108.

Automatic Creation of Precondition Queries

As discussed above, users can work on shared data locally/off-line. For example, a user can (but is not limited to) add data, remove data, and modify data while working with the shared data off-line. As a user interacts with the local shared data 114, 116 through, for example, a form provided by the distributed application 136, a command or transaction request is generated by the transaction request generator 118 for one or more modifications to the local shared data 114. A transaction request, in one embodiment, encapsulates the change in state of the value or values presented by a field or set of fields. For example, if the distributed application presents, for example, a form to a user including various fields such as (but not limited to) a "Name" field and an "Address field", a transaction request can be generated for each change to each field value. Alternatively, a single transaction request can be generated that includes all of the transaction (modifications) requested by the user.

In one embodiment, the shared data 110 (and the local shared data 114) is RDF data. In this embodiment, changes to the local shared data 114 are made via commands. As discussed above, a command represents a modification to the data 110 in the shared data store 112. A command can be a simple command such as changing the string value in a field or can be a complicated such as a large SQL update query. In a mutable RDF model, statements can be added and removed in the following manner: Add(s, p, o); Remove(Statement(s, p, o)); and RemoveAll(s, p, o) where s is a subject, p is a predicate, and o is an object. The notation for the RemoveAll command can be s|null, p|null, o|null. A subject, predicate, object set is commonly referred to as a triple. It should be noted that the RemoveAll command can accept patterns such as RemoveAll(s, null, null), which means remove all statements where the subject is s. Another pattern is RemoveAll(s, p, null) which means remove all statements where the subject is s and the predicate is p.

In one embodiment, the precondition generator 122 intercepts these methods to automatically create precondition queries to be performed against the local shared data 114. The precondition queries capture the state of the data (e.g., RDF graph) prior to the modifications made by the user. The precondition queries detect any conflicts that exist between the local shared data 114 and the shared data 110 at the shared data store 112. In one embodiment, the precondition query generator 122 translates commands (e.g., transactions) created by a user into precondition queries such as SPARQL queries. It should be noted that SPARQL is only used as an example and does not limit the present invention. For example, the precondition query can be a SQL query, XPath query, or the like.

Conflicts are detected by comparing an expected results set 126 to the shared data 110 at the shared data store 112. The precondition query creates the expected result set 126 based on the modification request and the local shared data 114, 116 (or the shared data 110 in the shared store 112). For example, consider an example of a form having a "Name" filed. The local shared data 114, 116 shows the current value in the name field being "Rob" and a user wants to change the field from "Rob" to "Robert". The precondition generator 122 generates the precondition that for the modification request to be valid, the "Name" field must be "Rob" prior to performing the modification. If the "Name" field is not "Rob", for example, because another user has modified the data, then the modification is not performed at the shared data store 112.

The following are examples of automatically creating precondition queries according to various embodiments of the present invention. In a first example, an address for User N does not exist on the local shared data 114 that the user is working with. Therefore, the user creates a command using the Add(s, p, o) statement for adding an address for User N. In particular, the user creates a command Add(User N, Address, Address 1) where User N is the subject, Address is the predicate, and Address 1 is the object. In other words, the command Add(User N, Address, Address 1) is a transaction indicating that Address 1 is to be added under the Address field associated with User N.

Once the user creates this command Add(User N, Address, Address 1), the precondition query generator 122 translates this command into an appropriate precondition query. In this example, the precondition query generator 122 generates a query in the form of SELECT ?s ?p ?o WHERE {?s, ?p, ?o}. The SELECT ?s ?p ?o clause indicates the variables the query wants returned. The WHERE {?s, ?p, ?o} clause provides the basic graph pattern to match against the data graph. With respect to the precondition query, different queries can be generated. For example, a precondition query can be created that ensures User N does not already have Address 1 as his address. If User N is associated with Address 1, someone else has already performed the action. Alternatively, the model can be initially queried to determine if the user is already associated with an address. In this example, a precondition query ensures that the previous address was still there when Address1 is to be inserted.

For example: (after querying the model but before creating this transaction, User N is determined to be associated with Address 0). A precondition query such as ASK {<User N> <Address> "Address 0"} can be created with an expected result of YES. If User N is not associated with an address, a precondition query such as SELECT {<User N> <Address> ?address} can be created without any expected bindings. This would make sure that somebody else did not insert "Address 2" in the meantime. The precondition query generator 122 then determines the initial bindings for the precondition query. In this example, the precondition query generator 122 determines that the initial bindings are User N for the subject, Address for the predicate, and Address 1 for the object. The precondition query generator 122 then pre-populates the precondition query with these bindings.

The precondition query is pre-populated with bindings so that the comparator 130 can determine if the triple being tested by the precondition query already exists. In other words, the bindings are an expected result set. The bindings describe each variable and what the expected value should be. For example, in SPARQL the bindings are grouped into an instance of the SPARQL Results Set XML Format. In the current example, the precondition query is performed against the shared data 110 in the shared data store 112 to determine if the triple User N, Address, Address 1 already exists. The precondition query can be performed when the user comes back on-line with the shared data store 112. In one embodiment, the data transaction module 138 creates a transaction comprising a change set (e.g., modification requested by the user), a query set (e.g., one or more precondition queries), and an expected result set (e.g., data that the precondition query expects to be resulted from the query). When this query is performed the results can be serialized in a markup language such as the Extended Markup Language ("XML"). The query results are stored in memory or a database.

The comparator 130 compares the results of the query against the expected results set 126 of the precondition query to determine if a match exists. If the triple being tested for by the precondition query exists at the shared data store 112 a conflict has been detected and the user is notified of the error. For example, while the user was off-line another user may have already added an address for User N. Therefore, the result of the precondition query shows that the triple User N, Address, Address 1 already exists and a conflict is detected. Stated differently, the expected result of Address 1 not being in the shared data 110 did not match the results returned by the precondition query. A user can be notified of a conflict via an error message of through a graphical user interface that indicates the location of the conflict or by any other means such as those discussed in the co-pending and commonly owned application entitled "Conflict Resolution For Distributed Processing Systems", U.S. Ser. No. 11/534,466 filed on Sep. 22, 2006.

The user can also be presented with a choice of accepting the conflicting data. For example, assume that the user wanted to an address for User N and a phone number, but an address was already added by another user. Therefore, a conflict exists between the transaction requested by the user and the data in the shared data store 112. The user can accept the conflict since the user was going to add the address anyway thereby allowing the phone number transaction to be added to the data. If the comparator 130 determines that the triple does not exist, i.e., the expected results were received, the transactions requested by the user can be applied.

The precondition can be re-executed to determine if the precondition query is satisfied. For example, if the precondition query showed that data already exists, i.e., a conflict exists, and a user changed the original transaction, the precondition query can be re-executed to ensure the data has not changed at the shared data store 112. In other words, the query is re-executed in order to verify that the expected results are still true at commit time in order to proceed. The target server uses the output of the query to compare with the bindings sent as part of the transaction.

The following is an example of the precondition query above given in an SPARQL Query Results XML Format.

```
<?xml version = "1.0"?>
<sparql xmlns = "http:://www.w3.org/2005/sparql-results#">
    <head>
        <variable name="S"/>
        <variable name="P"/>
        <variable name="O"/>
    </head>

<result>
            <binding name ="S">
```

-continued

```
      <uri>User N</uri>
      <binding name ="P">
        <uri>Address</uri>
      <binding name ="O">
        <literal>Address 1 </literal>
      </binding>
    </result>

</sparql>
```

The "head" in the above code comprises a sequence of "variable" elements that describe the variables in the results set. The "results" elements include a sequence of "result" elements. Each of the "result" elements in turn describes a binding for each variable name found in the head section of the document. Bindings can be (but not limited to) of type uri, literal with language, literal with data-type, or blank node.

It should be noted that the precondition queries are not limited to using the SELECT statement. For example, an ASK statement can be used which returns a true or false result. In this embodiment, the comparator 130 does not need to compare the results of the precondition query to the expected results. This is because the result of the precondition query is binary; either the query failed or was a success. An example of an ASK statement has been given above. In a second example, the user wants to remove an address, Address 1, associated with User N. Therefore, the user creates a command using the Remove(s, p, o) statement for removing Address 1 associated with User N. In particular, the user creates a command Remove(User N, Address, Address 1) where User N is the subject, Address is the predicate, and Address 1 is the object. In other words, the command Remove(User N, Address, Address 1) is a transaction indicating that Address 1 is to be removed under the Address field associated with User N.

Once the user creates this command Remove(User N, Address, Address 1), the precondition query generator 122 translates this command into an appropriate precondition query. In this example, the precondition query generator 122 generates a query in the form of SELECT ?s ?p ?o WHERE {?s, ?p, ?o}. The SELECT ?s ?p ?o clause indicates the variables the query wants returned. The WHERE {?s, ?p, ?o} clause provides the basic graph pattern to match against the data graph. An example of the precondition query is as follows for Remove(User N, Address, Address 1) is as follows: ASK {<User N> <Address> "Address 1"} or SELECT {<User N> <Address> ?address} where the results set with one variable called address and only one result with a binding for address and literal value equal to "Address 1". The precondition query generator 122 then determines the initial bindings for the precondition query. In this example, the precondition query generator 122 determines that the initial bindings are User N for the subject, Address for the predicate, and Address 1 for the object. The precondition query generator 122 then pre-populates the precondition query with these bindings.

The precondition query is pre-populated with bindings so that the comparator 130 can determine if the triple being tested by the precondition query already exists. In other words, the bindings are an expected result set. In the current example, the precondition query is performed against the shared data 110 in the shared data store 112 to determine if the triple User N, Address, Address 1 exists. The comparator 130 compares the results of the query against the expected results set 126 of the precondition query to determine if a match exists. If the triple being tested for by the precondition query exists at the shared data store 112, the data has not been changed and a conflict does not exist. This is different than the above example because the expected result set 126 indicated that the triple User N, Address, Address 1 should be returned. In the preceding example, the user wanted to add Address 1 because an address did not exist. Therefore, the expected result set 126 indicated that an Address should not exist at the shared data store 112. In the current example if Address 1 does not exist either because someone already removed the address or changed the address, the comparator 120 indicates that a conflict has been detected and the modification is not performed. The user can update his/her modification request to remove the new address if one exists or accept the current state of the data if the address has already been removed. If the user updates his/her modification request, the precondition can be re-executed to determine if the precondition query is satisfied.

The following is an example of the precondition query above given in an SPARQL Query Results XML Format.

```
<?xml version = "1.0"?>
<sparql xmlns = "http:://www.w3.org/2005/sparql-results#">
  <head>
    <variable name="s"/>
    <variable name="p"/>
    <variable name="o"/>
  </head>

<result>
      <binding name ="s">
        <bnode>User N </bnode>
      <binding name ="p">
        <bnode>Address </bnode>
      <binding name ="o">
        <bnode>Address 1 </bnode>
      </binding>
    </result>

</sparql>
```

In a third example, the user wants to remove everything associated with User N. Therefore, the user creates a command using the RemoveAll(s, p, o) statement for removing everything associated with User N. In particular, the user creates a command RemoveAll(User N, null, null) where User N is the subject, null is the predicate, and null is the object. In other words, the command RemoveAll(User N, Address, Address 1) is a transaction indicating that everything associated with User N is to be removed in the shared data store 112.

Once the user creates this command RemoveAll(User N, Address, Address 1), the precondition query generator 122 translates this command into an appropriate precondition query. In this example, the precondition query generator 122 generates a query in the form of SELECT ?s ?p ?o WHERE {?s, ?p, ?o}. The SELECT ?s ?p ?o clause indicates the variables the query wants returned. The WHERE {?s, ?p, ?o} clause provides the basic graph pattern to match against the data graph. The precondition query generated is similar to the precondition query for the Remove(User N, Address, Address 1) statement discussed above. The precondition query generator 122 then determines the initial bindings for the precondition query. In this example, the precondition query generator 122 determines that the initial bindings are User N for the subject and nothing for the predicate and object since they were both null in the command. The precondition query generator 122 then pre-populates the precondition query with this binding.

The comparator 130 compares the results of the query against the expected result set 126 of the precondition query to determine if a match exists. The expected result set 126, in this example, is the all of the data associated with User N as indicated by the local data 114. If the comparator determines that the data 110 at the shared data store 112 does not match the expected result set 126, a conflict is detected and the modification is not applied. For example, another user may have added new data or changed data associated with User N. The user can then determine if he/she still wants to remove all of the data associated with User N in light of this new/changed data. Alternatively, if a portion of the data has already been removed, the modification request can still be applied since the data was to be removed anyway.

It should be noted that the various embodiments present invention are not limited to single commands or commands comprising single statements as discussed above. For example, commands often execute a number of Add and Remove statements in a single execution. Therefore, various embodiments of the present invention store a plurality of precondition queries and results associated therewith. For example, a unique variable can be generated for the subject, predicate, and object of each precondition query. The original bindings of each precondition query are maintained. All of the generated variables can then be listed in the SELECT clause of the precondition query. All of the triple patterns are listed in the WHERE clause of the precondition query with a UNION marker between each.

The following is an example of a plurality of precondition queries being merged to produce a single precondition query and a single precondition query result. In this example, a user wants to perform Add, Remove, and RemoveAll operations. A generic Add statement can be represented as Add(r1, p1, r2). Therefore, a corresponding precondition query is created as SELECT ?s1 ?p1 ?o1 WHERE{?s1 ?p1 ?o1}. The precondition query is then populated with the following precondition bindings r1, p1, r2. A generic Remove statement can be represented as Remove(r1, p1, r2).

Therefore, a corresponding precondition query is created as SELECT ?s2 ?p2 ?o2 WHERE{?s2 ?p2 ?o2}. The precondition query is then populated with the following precondition bindings r1, p1, r2. A generic RemoveAll(r1, null, null) statement can be represented as RemoveAll(r1, null, null). Therefore, a corresponding precondition query is created as SELECT ?s3 ?p3 ?o3 WHERE{?s3 ?p3 ?o3}. The precondition query is then populated with the following precondition bindings r1. The merged query can be represented as SELECT ?s1 ?p1 ?o1 ?s2 ?p2 ?o2 ?s3 ?p3 ?o3; WHERE {{s1 ?p1 ?o1} UNION {?s2 ?p2 ?o2} UNION {?s3 ?p3 ?o3}}.

Based on the above generic example for producing a single precondition query and a single precondition query result a more detailed example is now given. In this example three separate calls are being made to perform an add operation in the same transaction: Add(<User N> <homePhone> "555-0000"), Add(<User N> <workPhone> "666-0000"), Add (<User N> <mobilephone> "777-0000"). Three separate ASK pre-condition queries are generated to ensure that those statements do not already exist in the model. However, the query can be combined into a single ASK query: ASK{<User N> <homePhone> "555-0000"; <workPhone> "666-0000"; <mobilephone> "777-0000"} and an expected result of false. Additional remove or removeAll calls can also be combined into a single precondition query. For example, Remove (<User N> <Address> "Address 1"), RemoveAll (<User N> <FaxPhone>*), Add(<User N> <Address> "Address 2"). In other words, the current address "Address 1" is being removed, all possible instances of <FaxPhone> are being removed, and another address 'Address 2' is being added. The SPARQL precondition is:

```
SELECT {
    <User N> <Address> ?address
    <User N> <FaxPhone> ?faxPhone
    OPTIONAL {
        <User N> <homePhone> ?homePhone
        <User N> <workPhone> ?workPhone
        <User N> <mobilePhone> ?mobilePhone
    }
}
```

The results set in return includes a binding for variable "address" to "Address 1" and not to "Address 2" or anything else. "faxphone" is bound to any literal value and finally ?homephone, ?workphone and ?mobilephone cannot be bound to the values "555-0000", "666-000", "777-000".

As can be seen from the above discussion, various embodiments of the present invention automatically generate preconditions queries associated with modification request. The precondition queries are able to detect conflicts between a requested modification and shared data 110 at a shared data store 112. The various embodiments of the present invention are advantageous because conflicts are able to be detected and developers no longer have to manually create precondition queries. As discussed above, manual creation of precondition queries is a very time consuming and tedious task.

Distributed Processing System Architecture
Information Processing System

Figure 2:
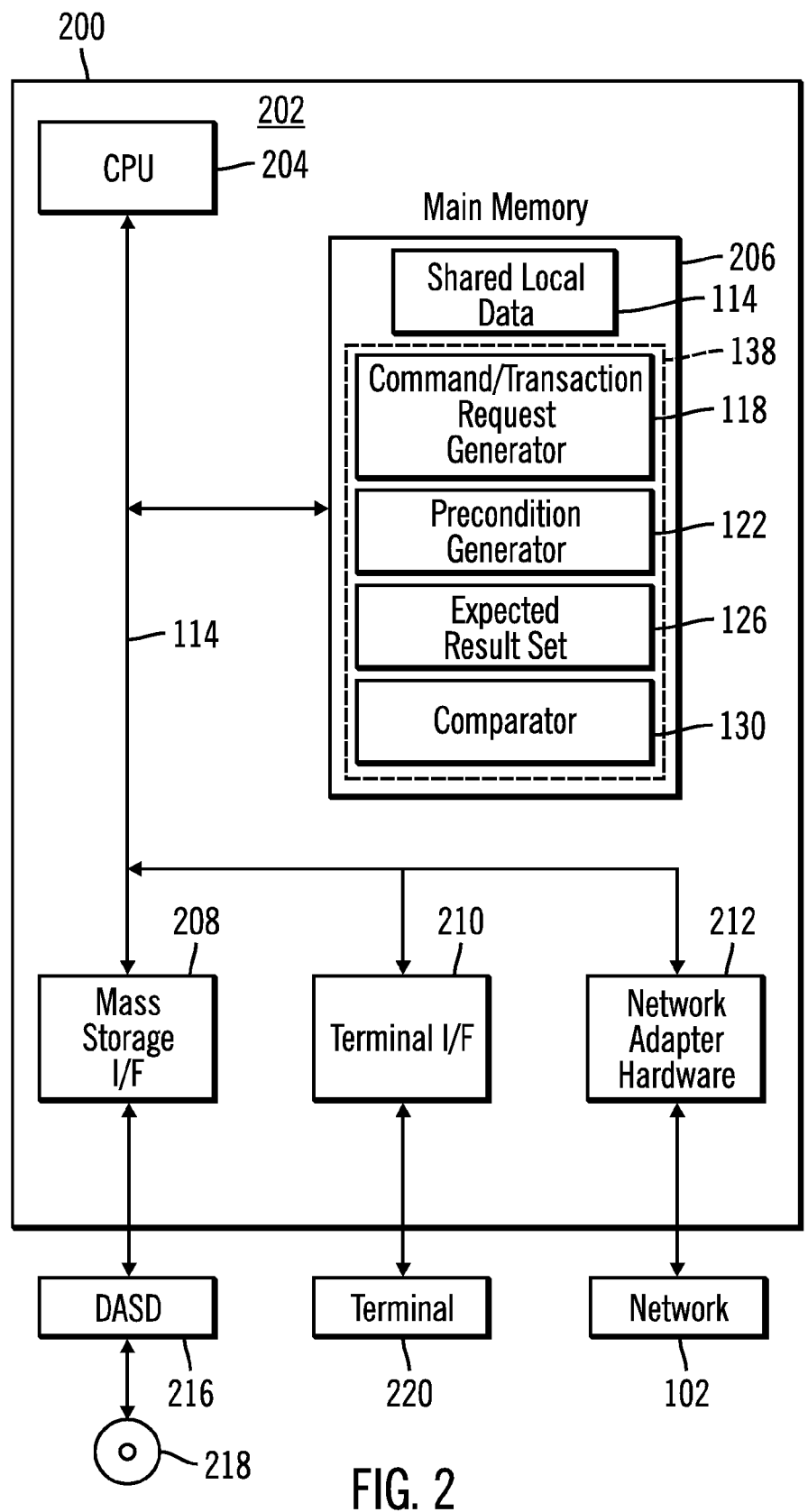
FIG. 2 is a detailed view of an information processing system according to the present invention.

FIG. 2 is a block diagram illustrating a detailed view of an information processing system 200 such as the client systems 104, 106 or the server 108 of FIG. 1. The information processing system 200 is based upon a suitably configured processing system adapted to implement the various embodiments of the present invention. Any suitably configured processing system is similarly able to be used as the information processing system 200 by some embodiments of the present invention, for example, a personal computer, workstation, or the like. The information processing system 104 includes a computer 202. The computer 202 includes a processor 204, main memory 206, a mass storage interface 208, a terminal interface 210, and network hardware 22. The mass storage interface 208 is used to connect mass storage devices such as data storage device 216 to the information processing system 200. One specific type of data storage device is a computer readable medium such as a CD drive or DVD drive, which may be used to store data to and read data from a CD 218 (or DVD). Another type of data storage device is a data storage device configured to support, for example, NTFS type file system operations.

The main memory 206, in one embodiment, includes the shared local data 114, command/transaction request generator 118, precondition generator 122, expected result set 126, and comparator 130. A discussed above, the local shared data 114 is a copy of shared data residing in a shared data store 110. A user of the information processing system 104 can interact with this local shared data 114 via a distributed application. The command/transaction request generator 118, precondition generator 122, expected result set 126, and comparator 130 reside within the data transaction module 128 and can all be provided to the information processing system via the distributed application.

Although only one CPU 204 is illustrated for computer 202, computer systems with multiple CPUs can be used equally effectively. Some embodiments of the present invention further incorporate interfaces that each includes separate, fully programmed microprocessors that are used to off-load processing from the CPU 204. The terminal interface 210 is used to directly connect the information processing system 200 with one or more terminals 220 to the information processing system 200 for providing a user interface to the computer 202. These terminals 220, which are able to be non-intelligent or fully programmable workstations, are used to allow system administrators and users to communicate with the information processing system 200. A terminal 220 is also able to consist of user interface and peripheral devices that are connected to the information processing system 200.

An operating system image (not shown) included in the main memory 206 is a suitable multitasking operating system such as the Linux, UNIX, Windows XP, and Windows Server operating system. Various embodiments of the present invention are able to use any other suitable operating system. Some embodiments of the present invention utilize architectures, such as an object oriented framework mechanism, that allows instructions of the components of operating system (not shown) to be executed on any processor located within the information processing system 200. The network adapter hardware 212 is used to provide an interface to the network 102. Various embodiments of the present invention are able to be adapted to work with any data communications connections including present day analog and/or digital techniques or via a future networking mechanism.

Although the various embodiments of the present invention are described in the context of a fully functional computer system, those skilled in the art will appreciate that embodiments are capable of being distributed as a program product via a CD/DVD, e.g. CD 218, or other form of recordable media, or via any type of electronic transmission mechanism.

Exemplary Process for Automatically Generating Precondition Queries

Figure 3:
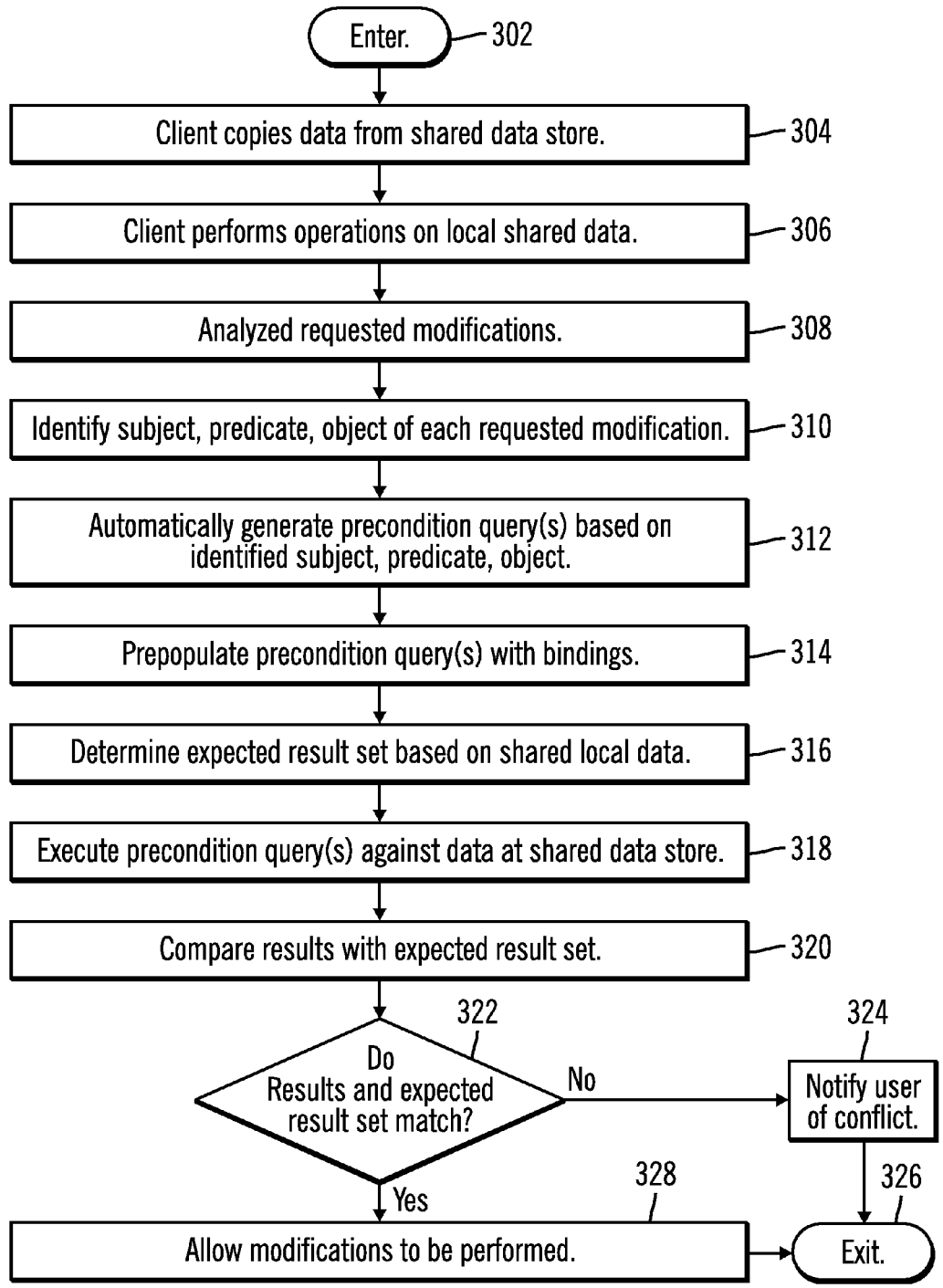
FIG. 3 is an operational flow diagram illustrating a process of automatically generating precondition queries according to one embodiment of the present invention.

FIG. 3 illustrates one process for automatically generating precondition queries. The operational flow diagram of FIG. 3 begins at step 302 and flows directly to step 304. A user, at step 304, interacts with local shared data 114 copied from the shared data store 112. For example, a user executes a distributed application. The distributed application allows for a user to interact with shared data 110 in a shared data store 112. The distributed application, retrieves the relevant shared data 110 from the shared data store 112 and creates a local copy 114.

The user, at step 306, performs operations on the local shared data 114. The data transaction module 138, at step 308, analyzes the modifications requested by the user. The precondition query generator 122, at step 310, identifies the subject, predicate, and object of each modification statement. The precondition query generator 122, at step 312, automatically generates precondition queries for each modification statement based on the identified subjects, predicates, and objects. The precondition query generator 122, at step 314, pre-populates the precondition queries with bindings as discussed above. An expected result set 126, at step 316, is determined. The precondition queries, as step 318, are executed against the shared data store 112. The comparator 130, at step 320, compares the results of the precondition queries with their respective expected result set 126.

The comparator 130, at step 322, determines if a precondition query result matches its expected result set 126. If the result of this determination is negative, the user, at step 324, is notified of a conflict. The control flow then exits at step 326. If the result of this determination is positive, the modification request, at step 328, is allowed to be performed at the shared data store 112. The control then flows to step 326 and exits.

Non-Limiting Examples

The various embodiments present invention as would be known to one of ordinary skill in the art could be produced in hardware or software, or in a combination of hardware and software. However in one embodiment the invention is implemented in software. The system, or method, according to the inventive principles as disclosed in connection with the various embodiments of the present invention, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the various embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing Resource Description Framework ("RDF") graphs in a distributed system, the method on a client information processing system comprising:

receiving at least one modification request for modifying an RDF graph in a shared data store, wherein the modification request includes at least one precondition query created based on a change set generated on a local shared data store associated with the shared data store, an expected result set, and the change set, wherein the precondition query comprises a set of preconditions that test a state of the RDF graph before executing the change set, wherein at least one precondition in the set of preconditions is based on a state of the local shared data store prior to the change set being applied at the local data store, wherein the expected result set is a set of results expected by the precondition query in response to applying the set of preconditions to the RDF graph, and wherein the change set is at least one statement that changes a set of data elements in the RDF graph;

applying the precondition query to the RDF graph at the shared data store;

analyzing a set of results of the precondition query; and sending, in response to the set of results of the precondition query matching the expected result set, a transaction request associated with the modification request to a server information processing system communicatively coupled to the shared data storage, wherein the transaction request comprises the change set.

2. The method of claim 1, wherein applying the precondition query further comprises:

analyzing a current state of the data elements.

3. The method of claim 1, wherein the expected result set comprises a result of at least one of True and False.

4. The method of claim 1, wherein the precondition query is one of:
a SPARQL SELECT statement; and
a SPARQL ASK statement.

5. The method of claim 1, wherein the set of results of the precondition query are formatted in a markup language.

6. The method of claim 5, wherein the markup language is one of:
XML;
HTML; and
XHTML.

7. The method of claim 1, further comprising:
notifying, in response to the set of results of the precondition query failing to match the expected result set, a user associated with the at least one modification set that a data conflict has been detected.

8. The method of claim 1, wherein the precondition query is one of:
a SQL query,
a SPARQL query, and
an Xpath query.

9. An information processing system for managing Resource Description Framework ("RDF") graphs in a distributed system, the information processing system comprising:
a memory;
a processor communicatively coupled to the memory; and
a data transaction module communicatively coupled to the memory and the processor, wherein the data transaction module is configured to perform a method comprising:
receiving at least one modification request for modifying an RDF graph in a shared data store, wherein the modification request includes at least one precondition query created based on a change set generated on a local shared data store associated with the shared data store, an expected result set, and the change set,
wherein the precondition query comprises a set of preconditions that test a state of the RDF graph before executing the change set, wherein at least one precondition in the set of preconditions is based on a state of the local shared data store prior to the change set being applied at the local data store, wherein the expected result set is a set of results expected by the precondition query in response to applying the set of preconditions to the RDF graph, and wherein the change set is at least one statement that changes a set of data elements in the RDF graph;
applying the precondition query to the RDF graph at the shared data store;
analyzing a set of results of the precondition query; and
sending, in response to the set of results of the precondition query matching the expected result set, a transaction request associated with the modification request to a server information processing system communicatively coupled to the shared data storage, wherein the transaction request comprises the change set.

10. The information processing system of claim 9, to applying the precondition further comprises:
analyzing a current state of the data elements.

11. The information processing system of claim 9, wherein the expected result set comprises a result of at least one of True and False.

12. The information processing system of claim 9, wherein the set of results of the precondition query are formatted in a markup language.

13. The information processing system of claim 9, wherein the further comprises:
notify, in response to the set of results of the precondition query failing to match the expected result set, a user associated with the at least one modification set that a data conflict has been detected.

14. A computer program storage product for managing Resource Description Framework ("RDF") graphs in a distributed system, the computer program storage product comprising instructions for:
receiving at least one modification request for modifying an RDF graph in a shared data store, wherein the modification request includes at least one precondition query created based on a change set generated on a local shared data store associated with the shared data store, an expected result set, and the change set,
wherein the precondition query comprises a set of preconditions that test a state of the RDF graph before executing the change set, wherein at least one precondition in the set of preconditions is based on a state of the local shared data store prior to the change set being applied at the local data store, wherein the expected result set is a set of results expected by the precondition query in response to applying the set of preconditions to the RDF graph, and wherein the change set is at least one statement that changes a set of data elements in the RDF graph;
applying the precondition query to the RDF graph at the shared data store;
analyzing a set of results of the precondition query; and
sending, in response to the set of results of the precondition query matching the expected result set, a transaction request associated with the modification request to a server information processing system communicatively coupled to the shared data storage, wherein the transaction request comprises the change set.

15. The computer program storage product of claim 14, wherein the instructions for applying the precondition query further comprise instructions for:
analyzing a current state of the data elements.

16. The computer program storage product of claim 14, wherein the expected result set comprises a result of at least one of True and False.

17. The computer program storage product of claim 14, wherein the precondition query is one of:
   a SPARQL SELECT statement; and
   a SPARQL ASK statement.

18. The computer program storage product of claim 14, wherein the set of results of the precondition query are formatted in a markup language.

19. The computer program storage product of claim 14, further comprising instructions for:

notifying, in response to the set of results of the precondition query failing to match the expected result set, a user associated with the at least one modification set that a data conflict has been detected.

20. The computer program storage product of claim 14, wherein the precondition query is one of:
   a SQL query,
   a SPARQL query, and
   an Xpath query.

* * * * *